(12) United States Patent  
Gilman

(10) Patent No.: US 11,768,366 B1  
(45) Date of Patent: Sep. 26, 2023

(54) QUICK ADJUSTMENT APPARATUS

(71) Applicant: Joshua Gilman, Woodstock, GA (US)

(72) Inventor: Joshua Gilman, Woodstock, GA (US)

(73) Assignee: Executive Firearms, LLC, Canton, GA (US)

( * ) Notice: Subject to any disclaimer, the term of this patent is extended or adjusted under 35 U.S.C. 154(b) by 0 days.

(21) Appl. No.: 17/869,836

(22) Filed: Jul. 21, 2022

(51) Int. Cl.
| | | |
|---|---|---|
| F41G 1/16 | (2006.01) |
| F41G 1/38 | (2006.01) |
| G02B 23/16 | (2006.01) |
| G05G 1/12 | (2006.01) |
| G02B 23/12 | (2006.01) |

(52) U.S. Cl.
CPC ............... *G02B 23/16* (2013.01); *G05G 1/12* (2013.01); *F41G 1/38* (2013.01); *G02B 23/12* (2013.01)

(58) Field of Classification Search
CPC .......... G02B 23/16; G02B 23/12; G05G 1/12; F41G 1/38
See application file for complete search history.

(56) References Cited

U.S. PATENT DOCUMENTS

| | | | | |
|---|---|---|---|---|
| 4,247,161 A * | 1/1981 | Unertl, Jr. ................. | F41G 1/38 |
| | | | | 42/122 |
| 5,521,757 A * | 5/1996 | Olson .................... | F41G 11/001 |
| | | | | 359/425 |
| 6,508,144 B1 * | 1/2003 | Vendetti .................... | G05G 1/10 |
| | | | | 74/553 |
| 7,969,673 B2 | 6/2011 | Hanna et al. | |
| RE46,011 E * | 5/2016 | Huber ........................ | F41G 1/38 |
| 2010/0162611 A1* | 7/2010 | Samson ................ | F41G 11/003 |
| | | | | 42/125 |
| 2013/0167425 A1* | 7/2013 | Crispin ...................... | F41G 1/16 |
| | | | | 42/119 |
| 2015/0205066 A1* | 7/2015 | Gibson .................... | G02B 7/04 |
| | | | | 29/428 |
| 2018/0087872 A1* | 3/2018 | White ........................ | F41G 1/38 |
| 2018/0313634 A1* | 11/2018 | Davidson .................. | F41G 1/38 |

FOREIGN PATENT DOCUMENTS

WO    WO 2020132491 A1 * 6/2020 ............. F41C 27/00

* cited by examiner

*Primary Examiner* — Vinh Luong
(74) *Attorney, Agent, or Firm* — HILL, KERTSCHER & WHARTON, LLP; Gregory T. Ourada

(57) ABSTRACT

The apparatus features a rotating collar and a static collar, in which one collar has an adjustment lever. The rotating collar is attached to a rotating portion of a focus knob for a device, which in one example is a night vision device. The static collar is attached to a non-rotating portion of the device immediately adjacent to the focus knob. The movement of the rotating collar and the focus knob that the rotating collar is attached to is constrained by mechanical interference between a static stop, the adjustment lever, and an adjustable stop.

3 Claims, 4 Drawing Sheets

QUICK ADJUSTMENT APPARATUS

BACKGROUND

Night vision devices are widely used by military and law enforcement personnel in a variety of tactical situations. The latest generation of these devices all incorporate one or more image intensifier tubes in a housing. The intensifier tube amplifies ambient light that passes through an objective lens. An intensifier tube typically contains a photocathode and a phosphorescent screen. Photons comprising ambient light are absorbed by the photocathode, which generates an electron pattern corresponding to the photons in the ambient light. The electrons pass through a micro channel plate which amplifies the electron pattern and projects it toward a phosphorescent screen. The phosphorescent screen absorbs the amplified electron pattern and generates an image corresponding to the amplified ambient light.

One of the inherent limitations of night vision devices is that they all have a very limited depth of focus. For example, in a nighttime tactical setting, an operator may need to first read a map at close range, which requires a near focus setting (i.e. "near zero"), and then quickly transition to viewing a target at long range, which requires a far focus (i.e. "infinity zero"). Operators typically set night vision devices at an infinity zero, and either remove the devices for close-in viewing, or use one eye for close-in viewing and the other eye for long range viewing. However, for pilots using night vision devices, where the night vision device is set at an infinity zero to see clearly outside of the aircraft, the pilot cannot see cockpit instruments at this setting.

Thus, in most tactical applications it is highly desirable, if not necessary, for the operator to be able to rapidly readjust the focus between two settings. However, it is currently not possible to adjust the focus between two focus settings quickly and consistently.

SUMMARY

The embodiments described herein effectively allow an operator of a night vision device to rapidly shift between two distinct preset focus positions. Generally, the two settings will be near zero and infinity zero. Such embodiments are quickly and easily retrofitted to existing night vision devices (e.g. AN/PVS-7, AN/PVS-14). FIG. 1 illustrates a third-generation night vision device 10, the AN/PVS-14 monocular, featuring a cylindrical focus knob 11 at the end of the image intensifier barrel containing the intensifier tube. The preferred embodiments consist of two collars that are designed to be installed on the night vision device as shown in FIG. 2A. One collar is attached to, and rotates with, focus knob 11, and the second collar is affixed to a non-rotating portion 110 of the image intensifier barrel immediately adjacent to the focus knob 11 and does not rotate relative to the image intensifier barrel. In the embodiment illustrated in FIG. 2A, the collar attached to the focus knob contains both an adjustment lever and an adjustable stop. When the focus knob collar is rotated in one direction, its rotation in this direction is limited when the adjustable stop contacts the static stop that is part of the collar attached to the image intensifier barrel. When the focus knob collar is rotated in the opposite direction, its rotation will be limited when the adjustment lever contacts the static stop. The collars are thus arranged so that the collar attached to the focus knob rotates with the focus knob, but its rotation is constrained by the limits set by the adjustable stop and the adjustment lever. The disclosed embodiments allow an operator to rapidly and accurately shift between two focus settings. With a night vision device, this is typically an infinity focus setting and a close-in focus setting.

Although exemplary embodiments herein involve applications to night vision devices, the apparatus disclosed herein may also be used with other equipment using suitably-shaped knobs that allow mounting of a static ring and a rotating ring. For example, on possible alternative use would be with a rifle scope, which are usually zeroed for one particular range only. However, the disclosed embodiments of the apparatus would allow a rifle scope to be zeroed at two distinct positions, and allow the operator to switch rapidly between the two zeroes. Similarly, the embodiments might also be used to rapidly switch between two focus or zoom settings on a camera.

BRIEF DESCRIPTION OF THE DRAWINGS

A more complete appreciation of the subject matter of the present invention and various advantages thereof may be realized by reference to the following detailed description and the accompanying drawings, in which.

DETAILED DESCRIPTION OF PREFERRED EMBODIMENTS

The invention is described in preferred embodiments in the following description with reference to the Figures, in which like numbers represent the same or similar elements. Reference throughout this specification to "one embodiment", "an embodiment", or similar language means that particular feature, structure, or characteristic described in connection with the embodiment is included in at least one embodiment of the present invention. Thus, appearances of the phrases "in one embodiment", "in an embodiment", "in certain embodiments", and similar language throughout this specification may, but do not necessarily, all refer to the same embodiment. It is noted that, as used in this description, the singular forms "a", "an", and "the" include the plural unless the context clearly dictates otherwise.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
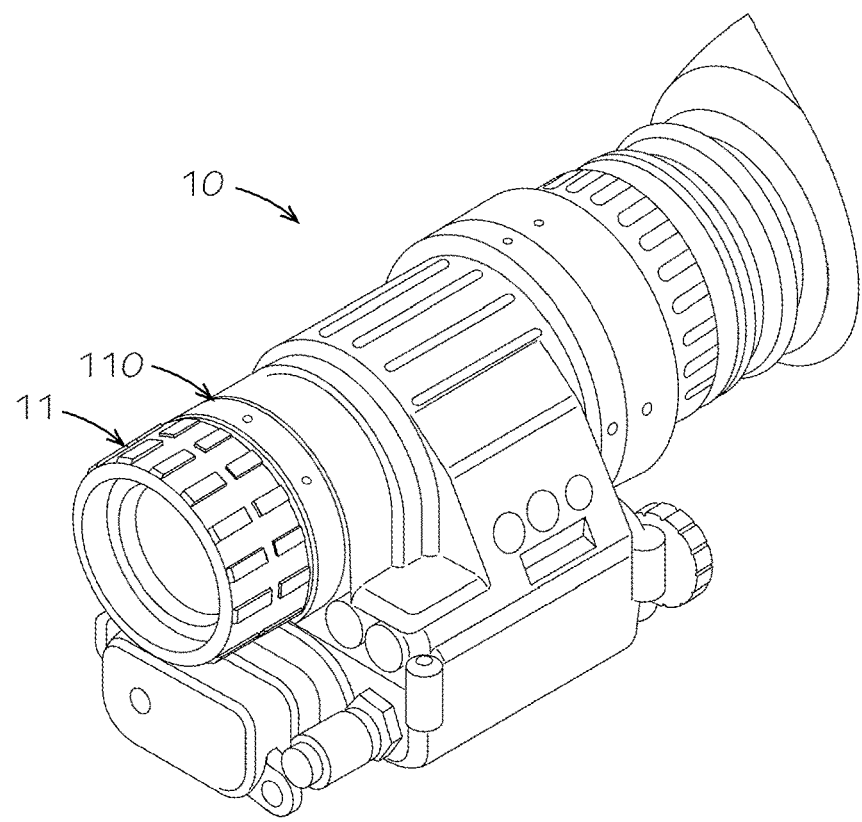
FIG. 1 is a perspective view illustrating the overall configuration of an unmodified AN/PVS-14 third-generation monocular night vision device with which embodiments of the device may be used.

The embodiments described in detail below may be rapidly installed on a night vision or other device featuring a rotating adjustment knob and permit an operator to rapidly and accurately shift between two specific adjustment settings. One preferred embodiment features two single split-type shaft collars, which will be referred to herein as a rotating collar and a static collar. A single-split shaft collar is used because these can be quickly and easily installed on night vision devices having a cylindrical image intensifier tube with a cylindrical focus knob at the end of the image intensifier tube, as illustrated in FIG. 1. Each collar may be constructed of plastic, metal, wood, or other material. The single split in the collar allows the collar's diameter to be temporarily increased, so that the static collar can slide over a cylindrical focus knob onto the image intensifier barrel, and the rotating collar can slide directly onto the cylindrical focus knob.

Figure 2A:
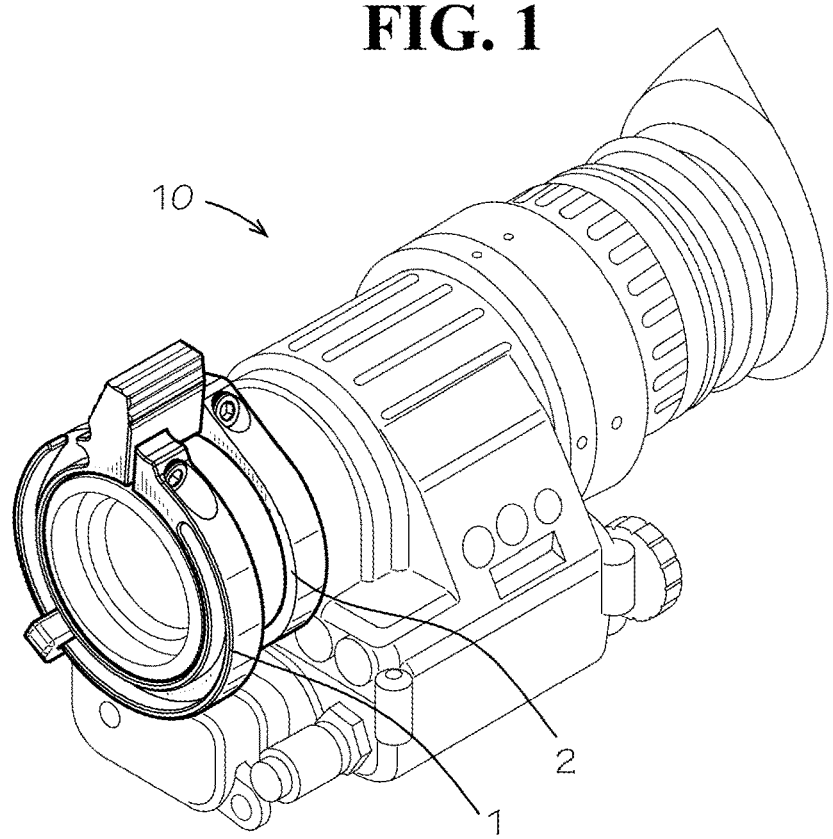
FIG. 2A is a perspective view illustrating one embodiment of the rotating collar and static collar installed on a AN/PVS-14 third-generation monocular night vision device and the adjustment lever in contact with the static stop.

With the above in mind, the details of one embodiment shown in FIGS. 3A and 3B will be described. The embodiment is comprised of a rotating collar 1 and a static collar 2. Each collar has a housing (static collar housing 21 and rotating collar housing 21') on each side of the gap in the collar. Static collar housing 21 and rotating collar housing 21' each have a keyway (static collar keyway 14 and rotating collar keyway 14') (see FIGS. 4B and 4E) accommodating an attachment screw which traverses the split and which is used to tighten the collars thereby holding them in the desired position. Each collar is made of a slightly elastic material, which allows each collar to be flexed, increasing the diameter of the hole, facilitating the collar's installation. In practice, static collar 2 is installed first by sliding it over and past focus knob 11 and onto the image intensifier barrel as shown in FIG. 2A. Before tightening the attachment screw for static collar 2, the static collar should be rotated so that one side of static stop 23 is in a position that corresponds to a first desired focus setting. When this position has been verified, attachment screw for static collar 2 is tightened until the static stop will not rotate due to friction between the static collar inner surface and the outer surface of the image intensifier barrel to which the static collar is attached.

Next, the attachment screw for rotating collar 1 is removed from housing 21, and the gap in the collar is opened to permit rotating collar 1 to slide onto focus knob 11. Before sliding rotating collar 1 onto the focus knob 11, adjustment lever 13 should be aligned so that one side of adjustment lever 13 will contact one side of static stop 23, as shown in FIGS. 2A and 3B. This defines a first adjustment (i.e. focus) position. Once the alignment is correct, rotating collar 1 should slide over the focus knob until the distal end of adjustment lever 13 overlaps the distal end of static stop 23 extending from static collar 2. Generally, the respective distal ends of adjustment lever 13 and static stop 23 will overlap such that they will be just short of contacting the rear face of static collar 2 and the front face of rotating collar 1, respectively. However, only minimal overlap of the distal ends is strictly necessary. On the other hand, it is generally undesirable for rotating collar 1 and static collar 2 to be so close that there is frictional engagement of the distal ends of each of adjustment lever 13 and static stop 23 are in frictional contact with the face of the opposite collar, as this inhibits free rotation of the rotating collar 1 relative to static collar 2.

Once each collar is in place, an attachment screw is inserted into the keyway 14 which traverses both sides of the attachment screw housing. The attachment screw is then tightened to the desired degree which ensures that the inner surface of the static collar is held securely to the image intensifier barrel via friction, and the rotating collar does not slide relative to the cylindrical focus knob.

Figure 4C:
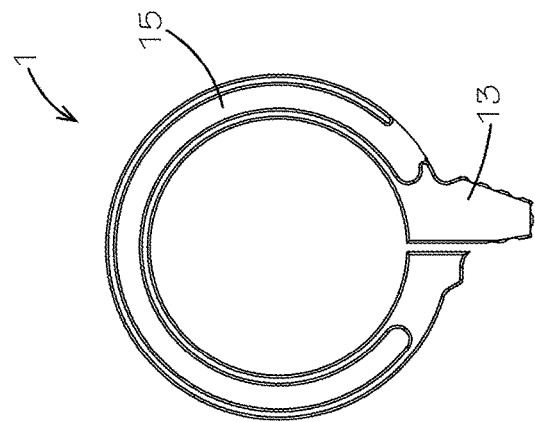
FIG. 4C is a rear view of the rotating collar according to one embodiment.
Figure 4F:
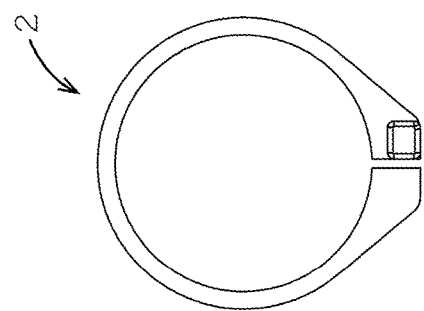
FIG. 4F is a rear view of the static collar according to one embodiment.
Figure 4B:
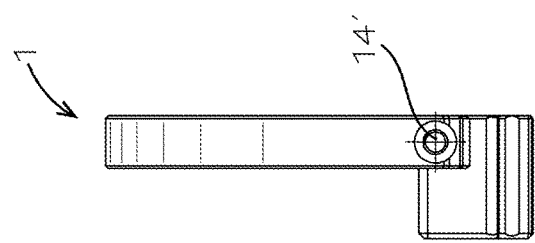
FIG. 4B is a side view of the rotating collar according to one embodiment.
Figure 4E:
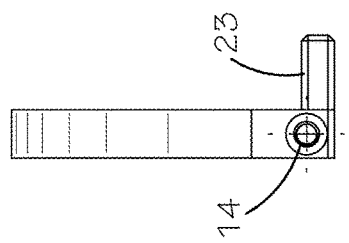
FIG. 4E is a side view of the static collar according to one embodiment.
Figure 4A:
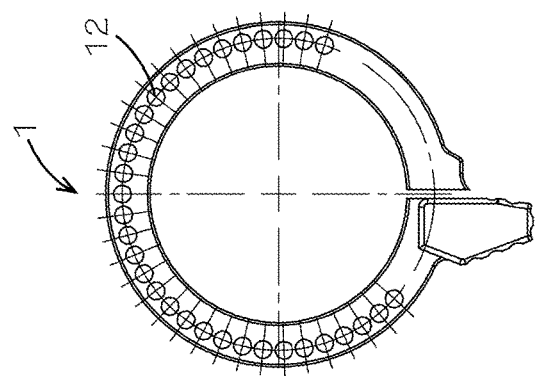
FIG. 4A is a front view of the rotating collar according to one embodiment.
Figure 4D:
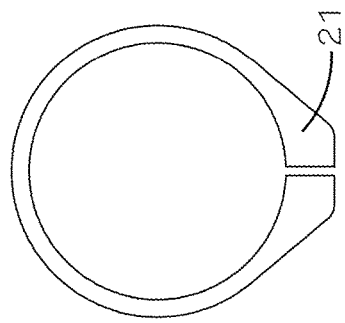
FIG. 4D is a front view of the static collar according to one embodiment.

The rotating collar 1 in one embodiment consists of an adjustment lever 13 which extends perpendicularly from the face of the rotating collar as illustrated in FIG. 4B. One side of the adjustment lever is intended to contact a side of the static stop 23, so this side is generally flat. Similarly, static collar 2 consists of static stop 23, which extends perpendicularly from the face of static collar 2 as illustrated in FIG. 4E. Rotating collar 1 is also characterized by a channel-type track 15 disposed on its rear face as shown in FIG. 4C, and a series of hemispherical adjustment holes 12 which are bored into its front face as illustrated in FIG. 4A.

Figure 5:
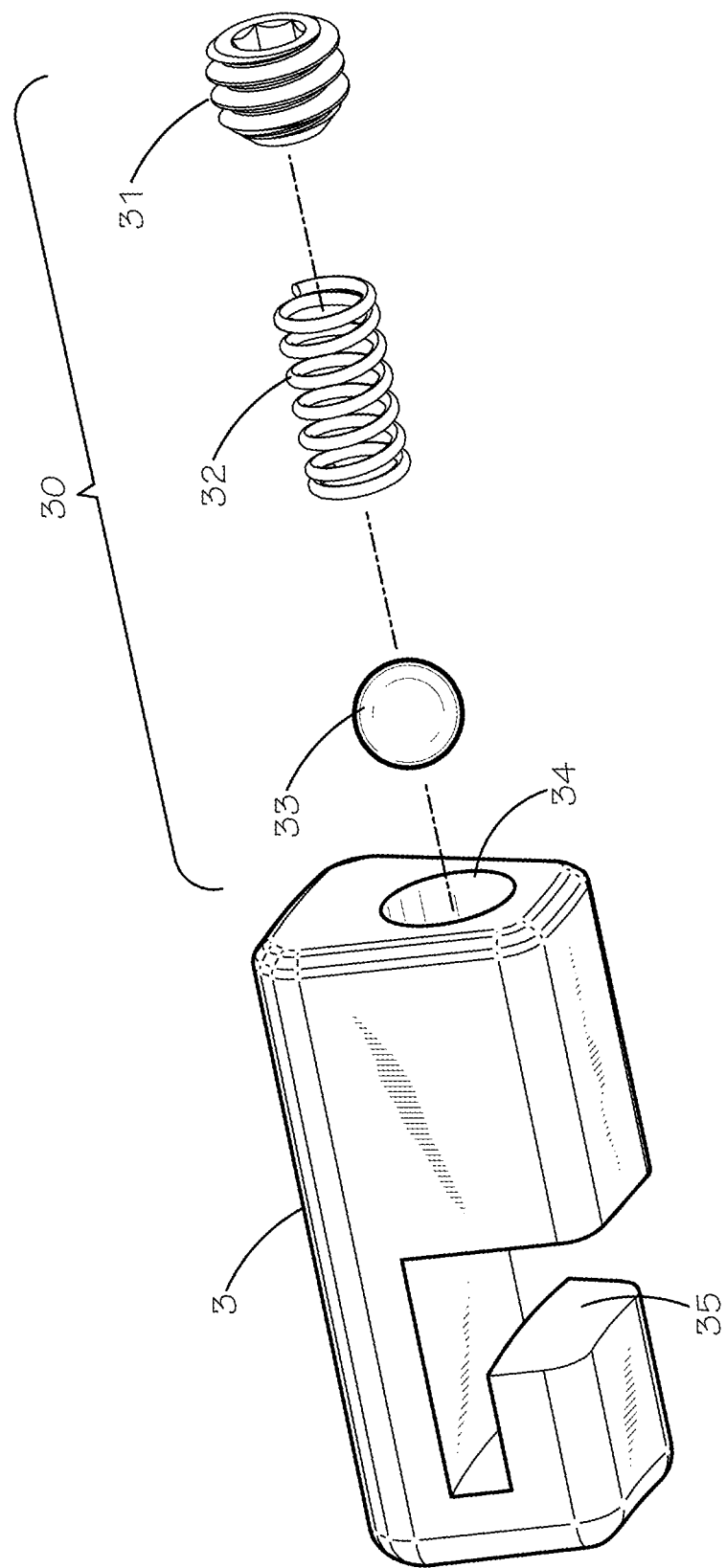
FIG. 5 is an exploded view of one embodiment of the adjustable stop according to one embodiment.

An exploded view of adjustable stop 3 in the above embodiment is presented in FIG. 5. Adjustable stop 3 in this embodiment features locking means 30 such as a ball lock consisting of screw 31, spring 32, and ball 33 disposed in bore 34, such that an approximately hemispherical portion of the ball 33 extends through a hole (not shown) that is on the lower side of bore 34 opposite j-rail 35. The hemispherical portion of the ball 33 corresponds to the shape of hemispherical adjustment holes 12. The portion of adjustable stop 3 opposite the ball is j-rail 35 which engages track 15 disposed on rear face of rotating collar 1. Spring 32 is selected so that its stiffness is sufficient to hold the adjustable stop firmly in place yet allows the stop to be moved around the circumference of rotating collar 1 when appropriate force is applied. Locking means 30 other than the aforementioned ball lock that are known to the art may also be used.

Thus, once static collar 2 and rotating collar 1 have been installed as described above, the next step is to use adjustment lever 13 of rotating collar 1 to rotate focus knob 11 to the second desired focus position.

Figure 3B:
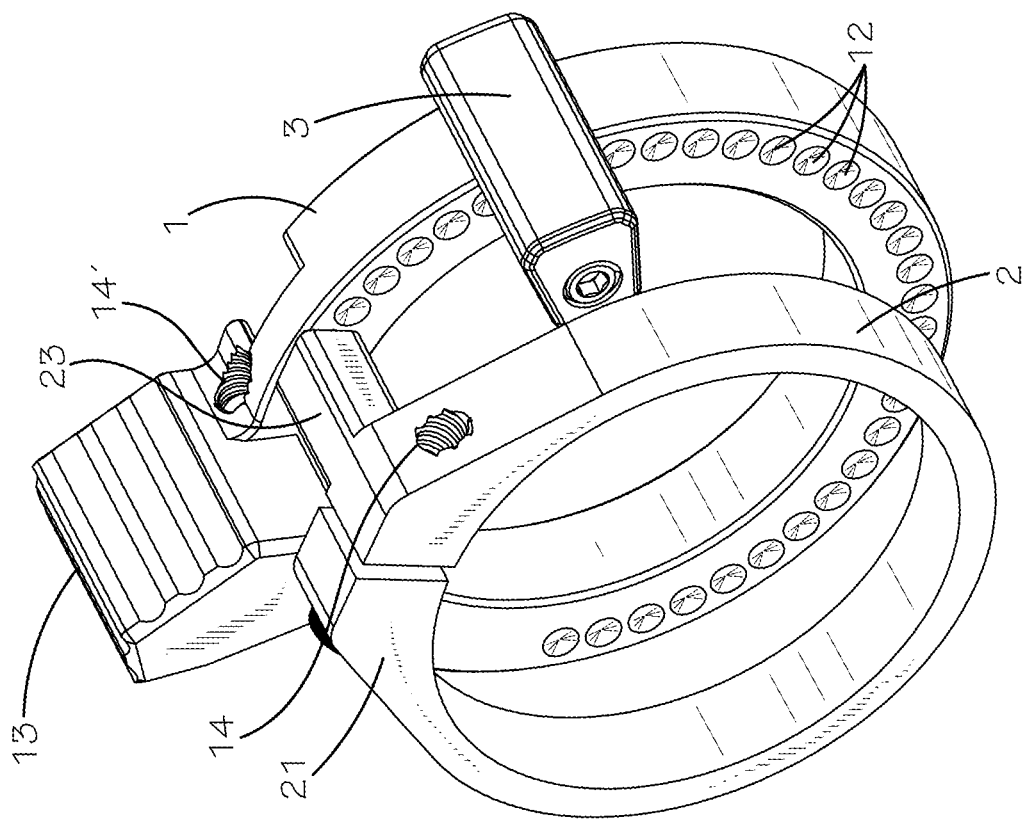
FIG. 3B is a perspective view illustrating an embodiment with the adjustment lever in contact with the static stop at a second exemplary predefined focus setting.
Figure 3A:
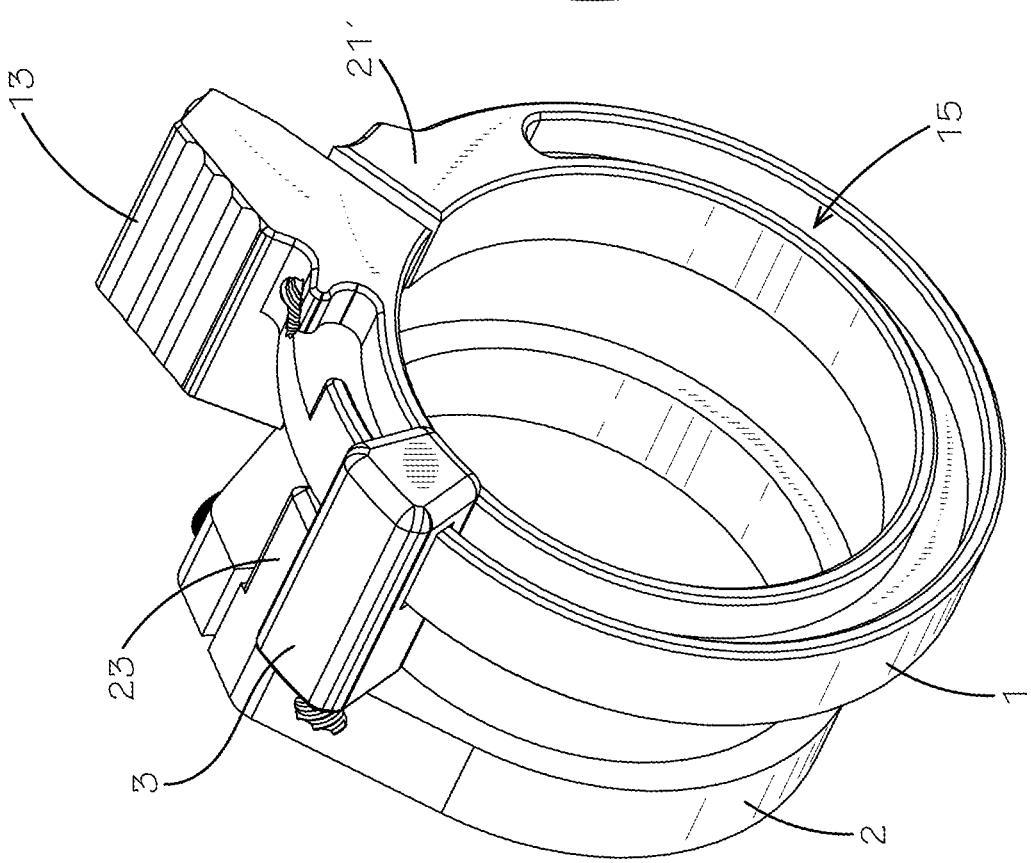
FIG. 3A is a perspective view illustrating an embodiment with the adjustable stop in contact with the static stop at a first exemplary predefined focus setting.

Then, holding focus knob 11 in place using adjustment lever 13, the adjustable stop 3 is moved into place by sliding it around the perimeter of rotating collar until one side face comes into contact with the static stop 23 of static collar 2, as shown in FIG. 3A. The ball lock mechanism will then engage to lock the adjustable stop into place.

FIGS. 3A and 3B illustrate the embodiments in two separate focus positions, the one shown in FIG. 3A at a first focus position with adjustable stop 3 contacting static stop 23, and a second focus position shown in FIG. 3B with adjustment lever 13 in contact with static stop 23.

A variety of variations on the embodiments above are contemplated. For example, adjustable stop 3 may feature a spring-loaded ball 33 disposed in bore 34 actuated by a lever extending from one side of the ball through a slot in the side of the adjustable stop. This would facilitate disengagement of the ball from the adjustment holes 12. In yet another variation, spring-loaded ball 33 for adjustable stop 3 could be replaced by a hemispherical protrusion in the upper segment of the adjustable stop, and a spring-tensioned j-rail 35 could be used to hold the hemispherical protrusion in place. Furthermore, the hemispherical shape adjustment holes 11 is exemplary only, and the holes may be any suitable shape desired (e.g. cylindrical, tetrahetral, etc.), with the ball 33 changing shape correspondingly. In yet another embodiment, adjustable stop 3 may feature a screw, which is accommodated by a threaded bore 34, and adjustment holes 12 are also threaded to accommodate the screw. This probably provides the most secure means of preventing motion of the adjustable stop. To facilitate adjustment, the top of the screw would be designed to that it can be turned by the fingers of an operator, e.g. using a knurled or ridged head. The overall concept is that adjustable stop 3 should be capable of being adjusted to different positions on the circumference of rotating collar 1.

In an alternate embodiment, channel track 15, adjustable stop 3, and adjustment holes 12 could be located on static collar 2. In this embodiment, rotating collar 1 would incorporate adjustment lever 13 extending toward static collar 2. Movement of rotating collar 1 would be constrained by the adjustment lever 13 contacting static stop 23 and adjustable stop 3. This embodiment could be used with a device other than the AN/PVS-14 shown in FIG. 1, where there are obstructions under the barrel to which the static collar is attached, which would limit the positions in which the adjustable stop may be placed.

Although the embodiments have been described in the context of use with a night vision device, application of the described embodiments to other devices featuring a cylindrical focus or adjustment knob that is located adjacent to a non-rotating barrel is also possible. For example, the device could be used in minimally-modified form with certain camera applications and rifle scopes.

The terminology used above is for the purpose of reference only, and is not intended to be limiting unless explicitly noted. For example, terms such as "upper," "lower," "above," "below," "rightward," "leftward," "clockwise," and "counterclockwise" refer to directions in the drawings to which reference is made. As another example, terms such as "inward" and "outward" may refer to directions toward and away from, respectively, the geometric center of the component described. As a further example, terms such as "front," "rear," "side," "left side," "right side," "top," "bottom," "inner," "outer," "horizontal," and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Indeed, the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally. Moreover, the disclosure set forth herein includes the mirror image, i.e., mirror configuration, taken from any perspective of any drawing or other configuration shown or described herein. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

What is claimed is:

1. An apparatus for use with a night vision device, the night vision device comprising a cylindrical focus knob, the apparatus comprising:
    a rotating collar adapted to attach to the cylindrical focus knob, the rotating collar comprising:
        a rotating collar housing comprising a rotating collar keyway adapted to accommodate a rotating collar attachment screw;
        an adjustment lever extending perpendicularly away from the rotating collar housing;
        a track;
        a plurality of adjustment holes disposed at regular intervals on a side of the rotating collar opposite the track;
        an adjustable stop comprising a spring-loaded ball adapted to releasably engage at least one of the plurality of adjustment holes, and a j-rail engaging the track, wherein a portion of the adjustable stop extends perpendicularly from the rotating collar in a direction parallel to the adjustment lever;
    a static collar adapted to attach to a non-rotating portion of the night vision device adjacent to the cylindrical focus knob, the static collar comprising:
        a static collar housing comprising a static collar keyway adapted to accommodate a static collar attachment screw;
        a static stop extending perpendicularly away from the static collar housing,
    wherein the static stop is oriented such that a distal end of the static stop is in proximity to the plurality of adjustment holes;
    wherein a first focus setting is defined by contact between the adjustment lever and the static stop, and a second focus setting is defined by contact between the adjustment lever and the adjustable stop.

2. An apparatus for adjusting a focus knob of a night vision device between two predetermined focus settings, comprising:
    a rotating collar adapted for installation on the focus knob comprising:
        a rotating collar housing comprising a rotating collar keyway adapted to accommodate a rotating collar attachment screw;
        a track disposed on a first side of the rotating collar;
        a plurality of adjustment holes disposed circumferentially on a second side of the rotating collar; and
        an adjustment lever extending perpendicularly from the second side; and
        an adjustable stop, wherein the adjustable stop is adapted to releasably engage at least one of the plurality of adjustment holes, and slidably engage the track;
    a static collar adapted for installation on a nonrotating portion of the night vision device adjacent to the focus knob, the static collar comprising:
        a static collar housing comprising a static collar keyway adapted to accommodate a static collar attachment screw; and
        a static stop extending perpendicularly from the static collar;

wherein the rotating collar and the static collar are installed proximate to each other, such that a distal end of the adjustment lever is proximate to the static collar, and a distal end of the static stop is proximate to the rotating collar; and wherein a first focus setting is defined by contact between the adjustment lever and the static stop, and a second focus setting is defined by contact between the adjustable stop and the static stop.

3. An apparatus for rapid transition of an adjustment knob of a device between two predetermined positions, wherein the device has a nonrotating portion disposed adjacent to the adjustment knob, the apparatus comprising:
- a rotating collar adapted to be attached to the adjustment knob comprising:
  - a rotating collar housing comprising a rotating collar keyway adapted to accommodate a rotating collar attachment screw;
  - a track disposed on a first side of the rotating collar;
  - a plurality of holes disposed on a second side of the rotating collar;
  - an adjustment lever extending perpendicularly away from the rotating collar in a first direction; and
- an adjustable stop comprising:
  - a rail adapted to engage the track;
  - locking means adapted to engage one or more of the plurality of holes, whereas the locking means urges the rail into contact with the track;
- a static collar attached to the nonrotating portion of the device, the static collar comprising a static stop extending away from the static collar parallel to the adjustment lever in a second direction;

and wherein a distal end of the static stop is proximate to the rotating collar, and wherein a distal end of the adjustment lever and a distal end of the adjustable stop are proximate to the static collar;

wherein a first predetermined position is defined when the adjustment lever and the static stop are in contact, and a second predetermined position is defined when the adjustable stop and the static stop are in contact.

* * * * *